(12) United States Patent
Su

(10) Patent No.: US 6,396,675 B1
(45) Date of Patent: May 28, 2002

(54) COMPUTER POWER SUPPLY DEVICE HAVING DUAL ADJUSTMENT TEMPERATURE CONTROLLED AIR FLOW DEVICE

(76) Inventor: Yen-Wen Su, 23608 Falcons View Rd., Diamend Bar, CA (US)

( * ) Notice: Subject to any disclaimer, the term of this patent is extended or adjusted under 35 U.S.C. 154(b) by 0 days.

(21) Appl. No.: 09/357,642

(22) Filed: Jul. 20, 1999

(51) Int. Cl.⁷ .................................................. H02H 5/04
(52) U.S. Cl. ........................ 361/103; 318/471; 318/472; 700/275; 700/278; 361/678; 361/695
(58) Field of Search ................................. 361/103, 687, 361/688, 690, 692, 694, 695, 699, 703, 707, 710, 712, 25, 27, 696, 697, 678; 165/80.2, 80.3, 186, 185; 713/323, 324; 318/471, 472; 700/275, 278

(56) References Cited
U.S. PATENT DOCUMENTS

| | | | |
|---|---|---|---|
| 4,734,012 A | * 3/1988 | Dob et al. ..................... | 417/32 |
| 5,121,291 A | * 6/1992 | Cope et al. ................... | 361/384 |
| 5,526,289 A | * 6/1996 | Dinh et al. ................... | 364/557 |
| 5,726,874 A | * 3/1998 | Liang ........................... | 363/141 |
| 5,963,424 A | * 10/1999 | Hileman et al. ............. | 361/695 |
| 6,023,402 A | * 2/2000 | Kaminski .................... | 361/103 |
| 6,046,921 A | * 4/2000 | Tracewell et al. ........... | 363/141 |

* cited by examiner

Primary Examiner—Fritz Fleming
Assistant Examiner—Robert L Deberadinis
(74) Attorney, Agent, or Firm—Troxell Law Office PLLC

(57) ABSTRACT

A high-efficiency, automatic detecting, and self-adjustable temperature controlled air flow device, more particularly a computer power supply having dual adjustment temperature controlled air flow device, includes a primary fan mounted at a front end of a power supply of a computer, and a secondary fan mounted at the other end. One side of the primary fan is provided with an adjustment knob to allow the user to adjust rotational speed. The secondary fan is controlled by an environmental temperature detecting circuit inside the power supply. The device can automatically adjust, detect, and provide high-efficiency heat dissipation effects.

2 Claims, 4 Drawing Sheets

COMPUTER POWER SUPPLY DEVICE HAVING DUAL ADJUSTMENT TEMPERATURE CONTROLLED AIR FLOW DEVICE

BACKGROUND OF THE INVENTION (a) Field of the Invention

The present invention relates to a computer power supply having dual adjustment temperature controlled air flow device.

(b) Description of the Prior Art

Conventional computer mainframes are provided with a power supply to supply the components with different voltages and converting direct currents into more stable alternating currents of different voltages. In general, a switching power supply and computer system require a stable and reliable heat dissipating device to maintain the normal functions of the system. A conventional power supply is provided with a single cooling fan near an outer edge thereof to help reduce the high heat generated thereby and the system so as to prevent overheating which may damage the system. The conventional construction is simple in construction and inexpensive. However, it easily breaks down and is not adjustable.

When the system is in a sleeping mode, the cooling fan of the conventional power supply in general continues to operate and does note really enter the phase of sleeping.

SUMMARY OF THE INVENTION

A primary object of the present invention is to provide a computer power supply having a dual adjustment temperature controlled air flow device to solve the problems of the prior art. According to the present invention, the device includes a primary fan and a secondary fan. The rotational speed of the primary fan is adjustable by the user. When the rotational speed is increased, air flow and heat dissipation is enhanced. When the rotational speed is reduced, noise can be lowered as well. The secondary fan is provided to continue to operate when the primary fan stops operation in a sleeping mode. The secondary fan is controlled by an environmental temperature detecting circuit so that it allows the power supply to operate in a low-temperature and low-noise environment, thus ensuring high reliability, high stability and lower power consumption.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
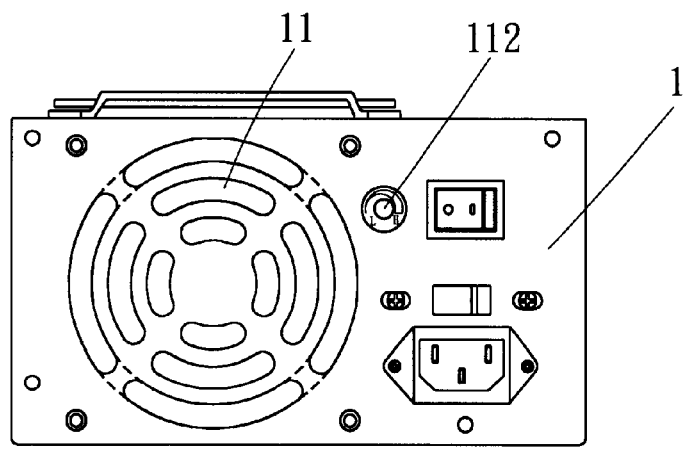
FIG. 1 is a front elevation of a power supply of the present invention provided with a primary fan.
Figure 2:
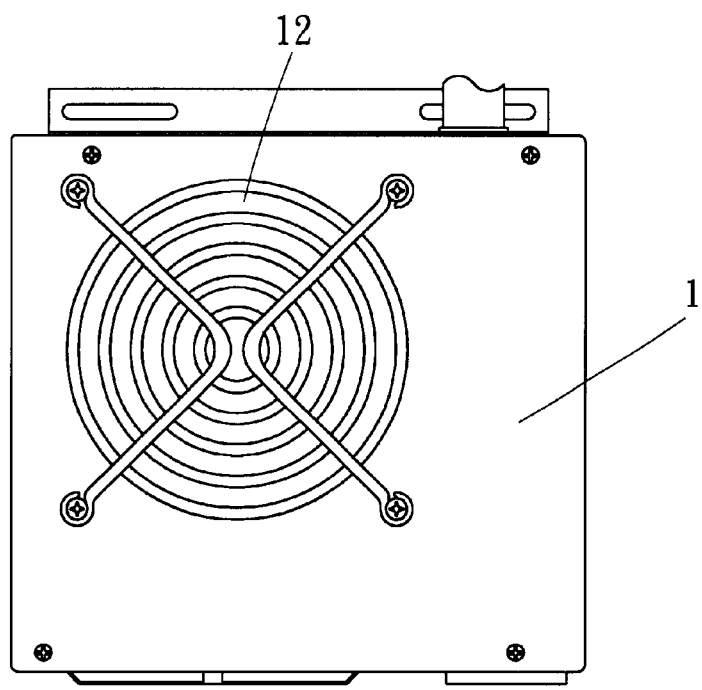
FIG. 2 is a top view of the power supply provided with a secondary fan.
Figure 3:
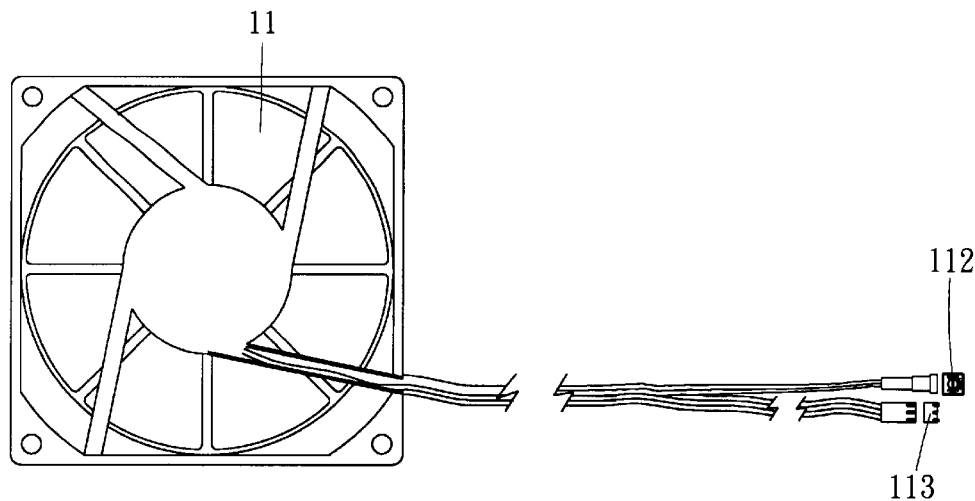
FIG. 3 is a schematic view of the structure of the primary fan.
Figure 4:
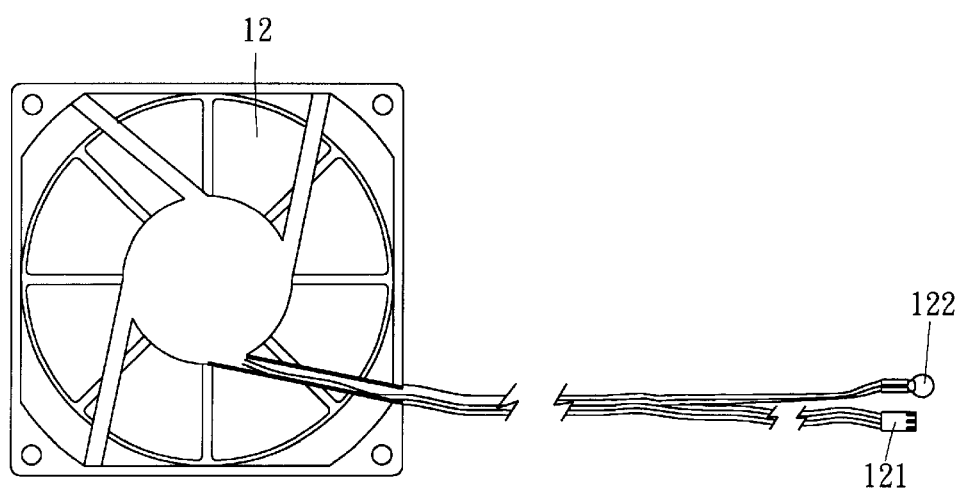
FIG. 4 is a schematic view of the structure of the secondary fan.
Figure 5:
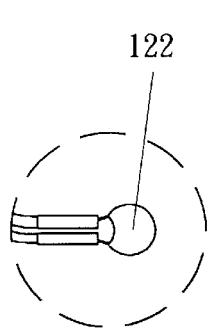
FIG. 5 is a schematic view of an environmental temperature detecting circuit provided on the secondary fan.
Figure 6:
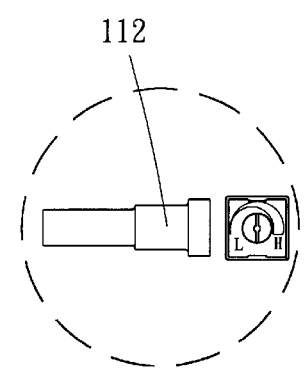
FIG. 6 is a schematic view showing an adjusting knob on the primary fan.
Figure 7:
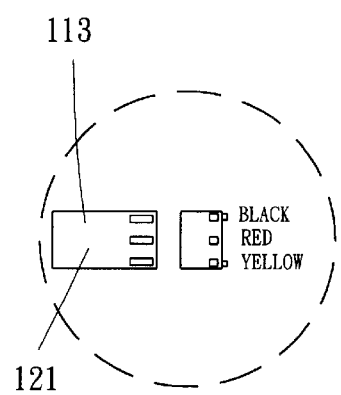
FIG. 7 is a schematic view showing power supply terminals provided on the fans.
Figure 8A:
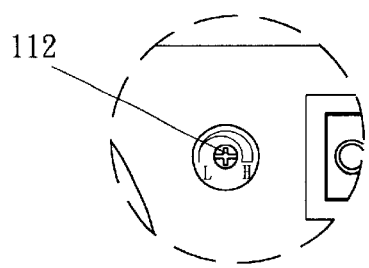
FIG. 8A is an enlarged view of area A in FIG. 9.
Figure 9A:
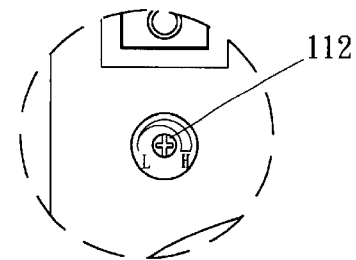
FIG. 9A is an enlarged view of area B in FIG. 10.
Figure 8:
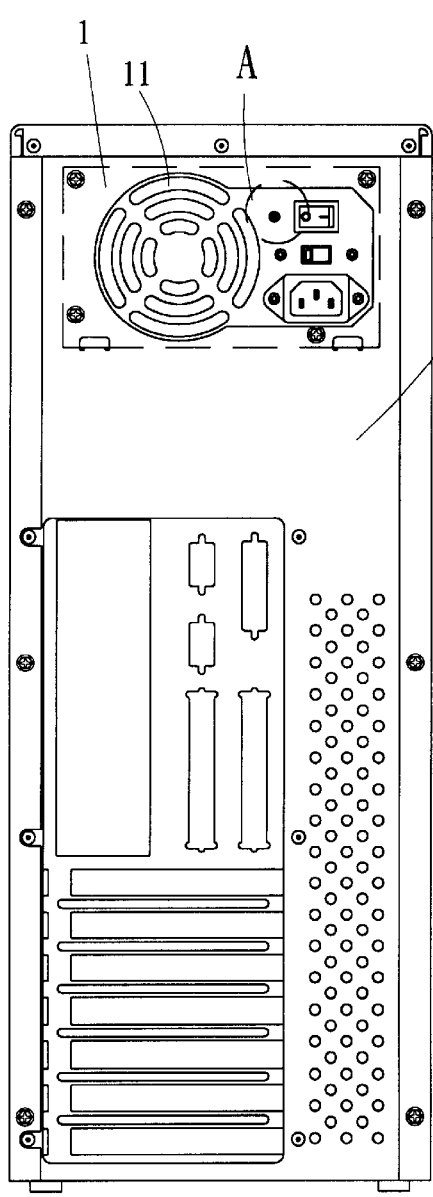
FIG. 8 is a schematic view of an embodiment in which the present invention is used on a vertical computer mainframe.
Figure 9:
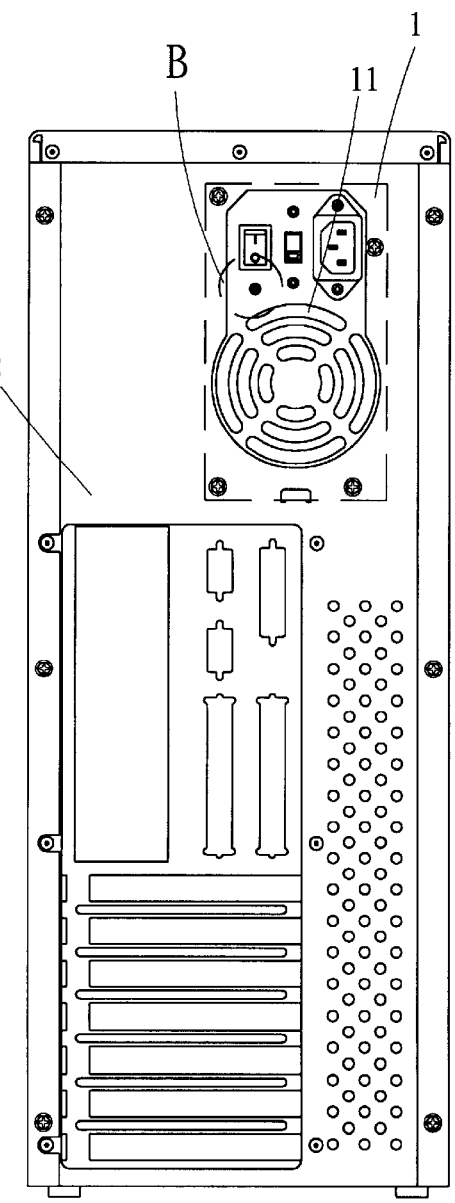
FIG. 9 is a schematic view of another embodiment in which the present invention is used in another vertical computer mainframe.
Figure 10A:
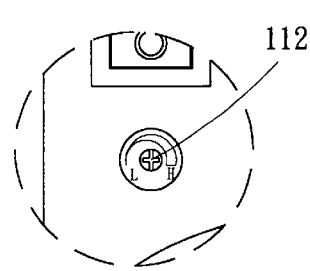
FIG. 10A is an enlarged view of area C in FIG. 11.
Figure 11A:
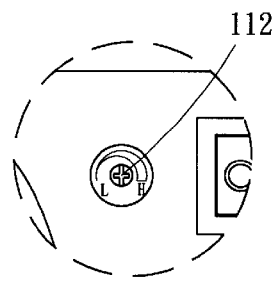
FIG. 11A is an enlarged view of area D in FIG. 12.
Figure 10:
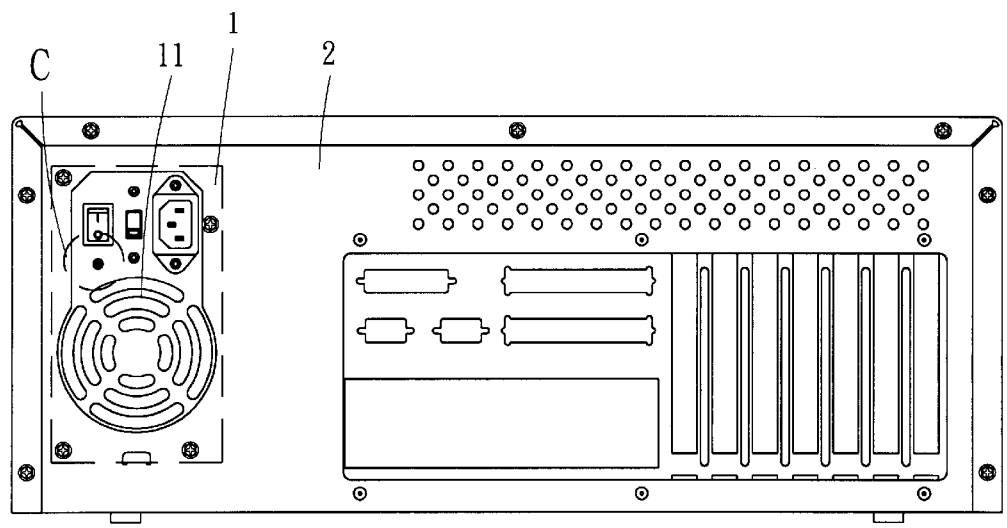
FIG. 10 is a schematic view of a further embodiment in which the present invention is used on a horizontal computer mainframe.
Figure 11:
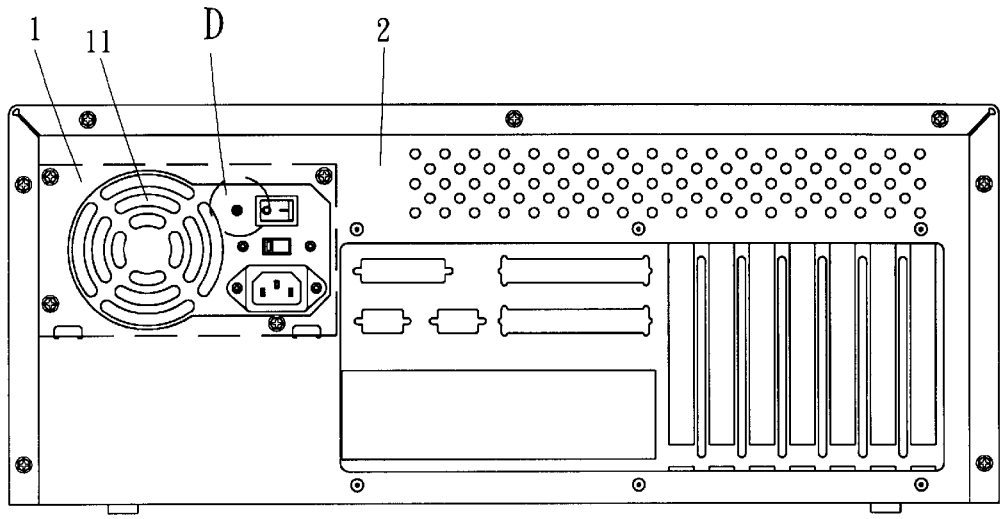
FIG. 11 is a schematic view of still another embodiment in which the present invention is used on a horizontal computer mainframe.

With reference to FIGS. 1 and 2, the present invention includes a power supply 1 that is provided with a primary fan 11 on a front side thereof, and a secondary fan 12 on one of the other sides. The surface of one side of the primary fan 11 on the front side of the housing of the power supply 1 is provided with a primary fan external adjusting knob 112 that is coupled with the primary fan 11 so that the user can easily adjust the rotational speed from the outside by hand or by using a simple tool.

With reference to FIGS. 3 to 8, the power supply 1 has a thyristor 111 exposed on and secured near a heat source of a system (M/B, CPU), and is connected to the system by a power line terminal 113 so that the rotational speed of the primary fan 11 will change with the changes in the temperature of the system under normal operating conditions of the computer system. When the system's temperature rises, due to the thyristor 111, the rotational speed of the primary fan 11 will increase to provide a greater air flow so as to enhance the heat dissipation effect of the system and to maintain the heat stability of the system (M/B, CPU).

When the system's temperature changes, the rotational speed of the primary fan 11 will automatically change. At the same time, the external adjusting knob 112 can be adjusted by hand from the outside to change the rotational speed of the primary fan 11 so as to obtain an appropriate balance between heat dissipation and noise. Compared to a conventional power supply having a single fan, the present invention provides an additional adjusting function.

When the secondary fan 12 malfunctions, the system's temperature will rise due to insufficient air flow. A temperature controlling circuit will detect the same via the thyristor 111 to automatically increase the rotational speed of the primary fan 11 so as to enhance air flow to balance and lower the temperature of the system, thereby preventing overheating which may damage the system. Obviously, the present invention can enhance the useful life and reliability of the system compared to the conventional power supply using a single fan.

When the system is in a sleeping mode, the primary fan 11 is turned off via the mainboard (M/B) so that there is only the secondary fan 12 working at a low speed to provide appropriate heat dissipation, thereby reducing power consumption and noise, while prolonging the useful life of the fan. This advantage is also lacking in the conventional power supply with a single fan.

Furthermore, the secondary fan 12 is connected to the power supply 1 by a power line terminal 121 and controlled by an environmental temperature detecting circuit 122 (see FIGS. 4 and 5) inside the power supply 1. The secondary fan 12 can increase or lower its rotational speed with the rise or drop of the system's internal temperature. When the primary fan 11 malfunctions, the system's temperature will rise due to insufficient air flow, and the secondary fan 12 will automatically increase rotational speed. In this way, the primary and secondary fans 11, 12 work in cooperation to provide efficient heat dissipation and prevent overheating of the system.

In operation, when the computer system is in a sleeping mode, the primary fan 11 is off, while the secondary fan 12 is in a low rotational speed, low power consumption, and low noise state to provide the system with an appropriate heat dissipation effect.

Reference is made to FIGS. 9 to 12, which show the power supply 1 of the present invention mounted in a vertical or horizontal type computer mainframe 2.

In summary, the present invention solves the problems of conventional power supplies in terms of heat dissipation by means of a dual fan structure and external rotational speed adjustment. The primary fan 11 is configured to allow adjustment of rotational speed as is needed, and the secondary fan 12 is configured to operate at a lower speed to allow the primary fan 11 to stop rotation when in a sleeping mode, thereby enabling the power supply 1 to operate in a low temperature and low noise environment. Hence, the system can have higher reliability and stability and lower power consumption.

Although the present invention has been illustrated and described with reference to the preferred embodiment thereof, it should be understood that it is in no way limited to the details of such embodiment but is capable of numerous modifications within the scope of the appended claims.

What is claimed is:

1. A power supply for a computer operable in a sleep mode, the power supply having a plurality of sides and a temperature control system comprising:

a) a first fan mounted on a first of the plurality of sides and including a first control system with a manually adjustable knob located on the first side, a first electrical temperature sensor located adjacent to a source of heat within the power supply, such that a speed of rotation of the first fan is automatically controlled to vary directly with a temperature sensed by the first electrical temperature sensor and such that the speed of rotation is manually adjustable by the adjustable knob, whereby the first control system shuts the first fan off when the computer is in the sleep mode; and, b) a second fan mounted on a second of the plurality of sides and including a second control system with a second electrical temperature sensor located within the power supply such that a speed of rotation of the second fan varies directly with a temperature sensed by the second electrical temperature sensor, whereby the second fan continues to rotate when the computer is in the sleep mode.

2. The power supply of claim 1 wherein the first electrical temperature sensor comprises a thyristor.

* * * * *